United States Patent
Klitsner et al.

(10) Patent No.: US 10,622,017 B1
(45) Date of Patent: Apr. 14, 2020

(54) APPARATUS, A SYSTEM, AND A METHOD OF DYNAMICALLY GENERATING VIDEO DATA

(71) Applicant: HipSync Inc, San Francisco, CA (US)

(72) Inventors: Dan Klitsner, Larkspur, CA (US); Gary Levenberg, San Francisco, CA (US); Brian Peter Clemens, Solana Beach, CA (US)

(73) Assignee: HIPSYNC INC., San Francisco, CA (US)

(*) Notice: Subject to any disclaimer, the term of this patent is extended or adjusted under 35 U.S.C. 154(b) by 112 days.

(21) Appl. No.: 16/016,028

(22) Filed: Jun. 22, 2018

Related U.S. Application Data

(60) Provisional application No. 62/524,275, filed on Jun. 23, 2017.

(51) Int. Cl.
| | | |
|---|---|---|
| *G11B 27/00* | (2006.01) | |
| *G06F 3/0488* | (2013.01) | |
| *H04N 5/445* | (2011.01) | |
| *H04N 5/91* | (2006.01) | |
| *G11B 27/031* | (2006.01) | |
| *H04N 5/77* | (2006.01) | |
| *G09B 19/00* | (2006.01) | |
| *G09B 5/02* | (2006.01) | |

(52) U.S. Cl.
CPC ........ *G11B 27/005* (2013.01); *G06F 3/04883* (2013.01); *G11B 27/031* (2013.01); *H04N 5/44591* (2013.01); *H04N 5/77* (2013.01); *H04N 5/91* (2013.01); *G06F 2203/04803* (2013.01); *G09B 5/02* (2013.01); *G09B 19/0038* (2013.01)

(58) Field of Classification Search
CPC . G11B 27/005; G11B 27/031; G06F 3/04883; G06F 2203/04803; H04N 5/44591; H04N 5/77; H04N 5/91; G09B 19/0038; G09B 5/02
USPC ........... 386/282; 345/659, 158, 629; 348/77, 348/135; 434/247, 257; 463/30, 43
See application file for complete search history.

(56) References Cited

U.S. PATENT DOCUMENTS

| | | | |
|---|---|---|---|
| 2010/0007603 A1* | 1/2010 | Kirkup | G06F 1/1616 345/158 |
| 2011/0098109 A1* | 4/2011 | Leake | A63F 13/428 463/30 |

(Continued)

*Primary Examiner* — Thai Q Tran
*Assistant Examiner* — Stephen R Smith
(74) *Attorney, Agent, or Firm* — Haverstock & Owens LLP

(57) ABSTRACT

Embodiments of the present invention is directed to dynamically generating video data. Video data is dynamically generated on an end-user device while an existing video is being played at a speed slower than a playback speed on the end-user device. The video data is a continuous recording of a field of view of a camera when the end-user device is in a first orientation that is converted to the playback speed of the existing video for viewing. The field of view includes a user(s) who will be mimicking movements of a performer(s) in the existing video that is being played on the end-user device. When the end-user device is in a second orientation, the existing video is played at the play back speed and side-by-side with the video data. The first and second orientations of the end-user device can be, for example, a vertical orientation and a horizontal orientation, respectively.

20 Claims, 8 Drawing Sheets

(56) References Cited

U.S. PATENT DOCUMENTS

| | | | | |
|---|---|---|---|---|
| 2011/0306396 | A1* | 12/2011 | Flury | G06F 3/011 |
| | | | | 463/7 |
| 2012/0206577 | A1* | 8/2012 | Guckenberger | G09B 19/003 |
| | | | | 348/47 |
| 2012/0268609 | A1* | 10/2012 | Yoo | G06K 9/00342 |
| | | | | 348/180 |
| 2013/0316316 | A1* | 11/2013 | Flavell | G16H 20/30 |
| | | | | 434/247 |
| 2015/0100885 | A1* | 4/2015 | Riley | H04M 1/72519 |
| | | | | 715/720 |
| 2016/0050449 | A1* | 2/2016 | Cho | H04N 21/4126 |
| | | | | 345/659 |
| 2017/0062012 | A1* | 3/2017 | Bloch | G11B 27/10 |
| 2018/0107303 | A1* | 4/2018 | Park | H01H 13/66 |

* cited by examiner

APPARATUS, A SYSTEM, AND A METHOD OF DYNAMICALLY GENERATING VIDEO DATA

RELATED APPLICATIONS

This application claims benefit of priority under 35 U.S.C. section 119(e) of the U.S. Provisional Patent Application Ser. No. 62/524,275 filed Jun. 23, 2017, entitled "HipSync," which is hereby incorporated by reference in its entirety.

FIELD OF INVENTION

The present invention relates to the field of video processing systems, and, more particularly, to an apparatus, a system, and a method of dynamically generating video data.

BACKGROUND OF THE INVENTION

User consumption of videos on mobile electronic devices has become increasingly prevalent. While technological advancement have been made in developing and distributing videos to viewers, there exists a need for an innovative way to dynamically create, view and share videos on these mobile electronic devices used by the viewers.

BRIEF SUMMARY OF THE INVENTION

Embodiments of the present invention is directed to dynamically generating video data. Video data is dynamically generated on an end-user device while an existing video is being played at a speed slower than a playback speed on the end-user device. The video data is a continuous recording of a field of view of a camera when the end-user device is in a first orientation that is converted to the playback speed of the existing video for viewing. The field of view includes a user(s) who will be mimicking movements of a performer(s) in the existing video that is being played on the end-user device. When the end-user device is in a second orientation, the existing video is played at the play back speed and side-by-side with the video data. The first and second orientations of the end-user device can be, for example, a vertical orientation and a horizontal orientation, respectively.

In one aspect, a method is provided. The method includes a computing device accessing a video stream from a source. The source could be a location either local to or remote from the computing device. When the computing device is positioned in a first orientation, a first graphical user interface (GUI) that includes a first display area is generated on the computing device. The video stream is played at a speed slower than a playback speed in the first display area of the first GUI, while a field of view of a camera is simultaneously being recorded. The field of view includes at least one user who will mimic what is displayed in the first GUI. In some embodiments, the field of view of the camera is concurrently displayed with the video stream in the first display area of the first GUI.

In response to detecting, by the computing device, that the computing device is positioned in a second orientation that is different from the first orientation, a second GUI that includes a second display area is generated on the computing device. The video stream is concurrently played at the playback speed and side-by-side with a converted recording, in the second display area of the second GUI. The converted recording is the recording converted to the same playback speed as the video stream. The converted recording is the recording converted on the fly. Alternatively, the converted recording is the recording converted when the recording had stopped.

In some embodiments, when the computing device is positioned in the second orientation, the converted recording is concurrently played side-by-side with another converted recording, in the second display area of the second GUI.

In some embodiments, when the computing device is positioned in the second orientation, upon detecting a swipe gesture of a first type on the computing device, another converted recording associated with the same musical content as that of the video stream is accessed from a destination, and the another converted recording associated with the same musical content as that of the video stream is played on the computing device.

In some embodiments, when the computing device is positioned in the second orientation, upon detecting a swipe gesture of a second type on the computing device, wherein the first type is different from the second type, a converted recording associated with a musical content different from that of the video stream is accessed from the destination, and the converted recording associated with the musical content different from that of the video stream is played on the computing device.

In some embodiments, the converted recording is transmitted such as for storing.

In some embodiments, the converted recording is transmitted to another computing device to create a video thread based on the converted recording.

In another aspect, an apparatus is provided. The apparatus includes at least one sensor, a camera, and a controller. The controller is operable to access a video stream from a source, upon detection by the at least one sensor that the apparatus is positioned in a first orientation, generate a first graphical user interface (GUI) that includes a first display area, and play the video stream at a speed slower than a playback speed in the first display area of the first GUI, while simultaneously recording a field of view of the camera, and upon detection by the at least one sensor that the apparatus is positioned in a second orientation that is different from the first orientation, generate a second GUI that includes a second display area, and concurrently play side-by-side the video stream at the playback speed and a converted recording in the second display area of the second GUI. The field of view includes at least one user who will mimic what is displayed in the first GUI.

In some embodiments, the at least one sensor includes an orientation sensor.

In some embodiments, the converted recording is the recording converted on the fly. Alternatively, the converted recording is the recording converted when the recording had ended. The recording ends when the video ends or when apparatus is no longer in the first orientation.

In yet another aspect, a system is provided. The system includes an end-user device configured to access a video stream from a source, when the end-user device is positioned in a first orientation, generate a first graphical user interface (GUI) that includes a first display area, and play the video stream at a speed slower than a playback speed in the first display area of the first GUI, while simultaneously recording a field of view of a camera, and upon detecting that the end-user device is positioned in a second orientation that is different from the first orientation, generate a second GUI that includes a second display area, and concurrently play side-by-side the video stream at the playback speed and a converted recording in the second display area of the second GUI. The system also includes a server communicatively coupled with the end-user device, wherein the server is configured to receive from the end-user device the converted recording for storing. The field of view includes at least one user who will mimic what is displayed in the first GUI.

In some embodiments, the server is also configured to receive from a plurality of end-user devices a plurality of converted recordings to stitch the plurality of converted recordings together into a video thread, and transmit the video thread to at least one of the plurality of end-user devices.

In some embodiments, the video stream is augmented by computer-generated perceptual information. In some embodiments, the converted recording is augmented by computer-generated perceptual information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention is directed to dynamically generating video data. Video data is dynamically generated on an end-user device while an existing video is being played at a speed slower than a playback speed on the end-user device. The video data is a continuous recording of a field of view of a camera when the end-user device is in a first orientation that is converted to the playback speed of the existing video for viewing. The field of view includes a user(s) who will be mimicking movements of a performer(s) in the existing video that is being played on the end-user device. When the end-user device is in a second orientation, the existing video is played at the play back speed and side-by-side with the video data. The first and second orientations of the end-user device can be, for example, a vertical orientation and a horizontal orientation, respectively.

Figure 1:
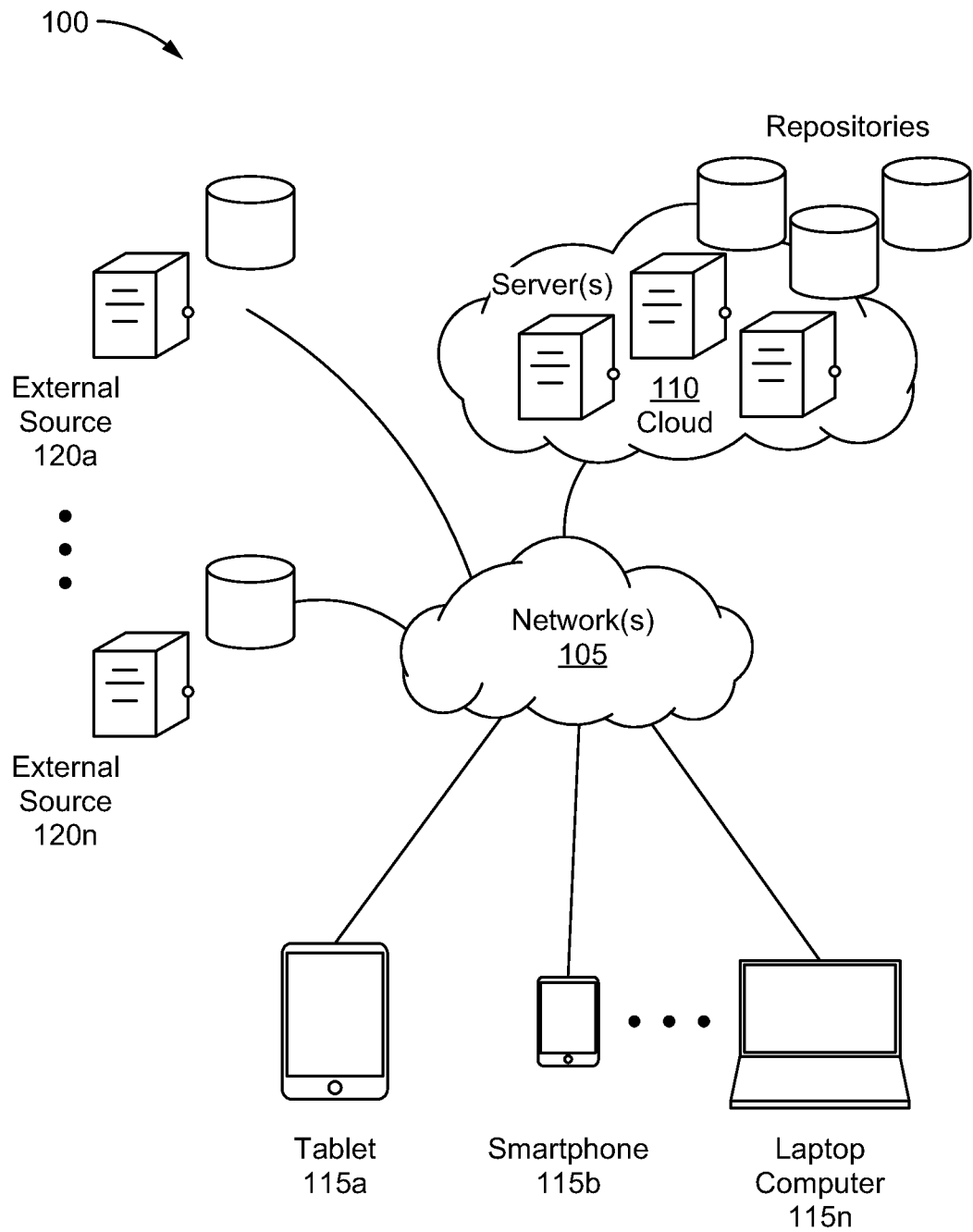
FIG. 1 illustrates an exemplary system according to some embodiments.

FIG. 1 illustrates an exemplary system 100 according to some embodiments. The system 100 typically includes a network(s) 105, such as the Internet, and a service cloud 110 that is communicatively coupled with one or more end-user devices 115, collectively, via the network 105. A server(s) in the cloud 110 provides a "hipsyncing" service to its users using the end-user devices 115. The server is accessible via a client application on the end-user devices 115. The client application can be mobile, TV or web-based. The server is able to store and retrieve video contents at and from one or more repositories. The video contents stored at the repositories include at least three types of videos: existing videos, "hipsynced" videos, and threaded videos. Each of these types of videos will now be briefly explained but is further discussed below.

An existing video is a video of a performer's or a group of performers' movements, which can be accompanied with musical content or soundtrack, wherein one or more users in the view of the camera mimic these movements while viewing the existing video on an end-user device 115. The movements can be live actions (e.g., by a professional(s) or of an amateur(s)) or animated actions. An existing video can be previously and locally created on an end-user device 115 prior to viewing. As such, a source of an existing video can be an end-user device 115. However, it is also contemplated that a source can be an external networked source 120, such as YOUTUBE video sharing website, that is communicatively coupled with the network 105 and retrievable by an end-user device 115 and/or the server. A hipsync video is a video recording of one or more users in view of a camera mimicking movements in an existing video. A threaded video, or simply a thread, is a server created video of numerous hipsynced videos that have been "threaded" or otherwise combined together into one video.

In some embodiments, the video contents stored at the repositories are organized such that the video contents can be searched. For example, existing videos can be searched and returned along with any related hipsynced videos and related stitched videos. Tags, including system generated and user generated tags, can be associated with each video content for organization, storage, and retrieval purposes. The one or more repositories can be located in the cloud 110, as illustrated in FIG. 1, although the repositories can be located elsewhere in the system 100 as long as the repositories are accessible by the cloud server(s).

The hipsyncing service can require its users to become subscribers by creating accounts in the cloud 110. In some embodiments, a user can use the hipsyncing service without creating an account and becoming a subscriber. However, an account allows a subscriber to set preferences, such as notifications and information sharing settings, and to identity, upload, or save existing videos and their hipsynced videos at the cloud 110. Within the client application, a user is able to provide a specific external networked source(s) 120 for the server to pull therefrom an existing video. In some embodiments, once the server has a copy of the existing video, the existing video can be shared with and viewed by other users.

Figure 2:
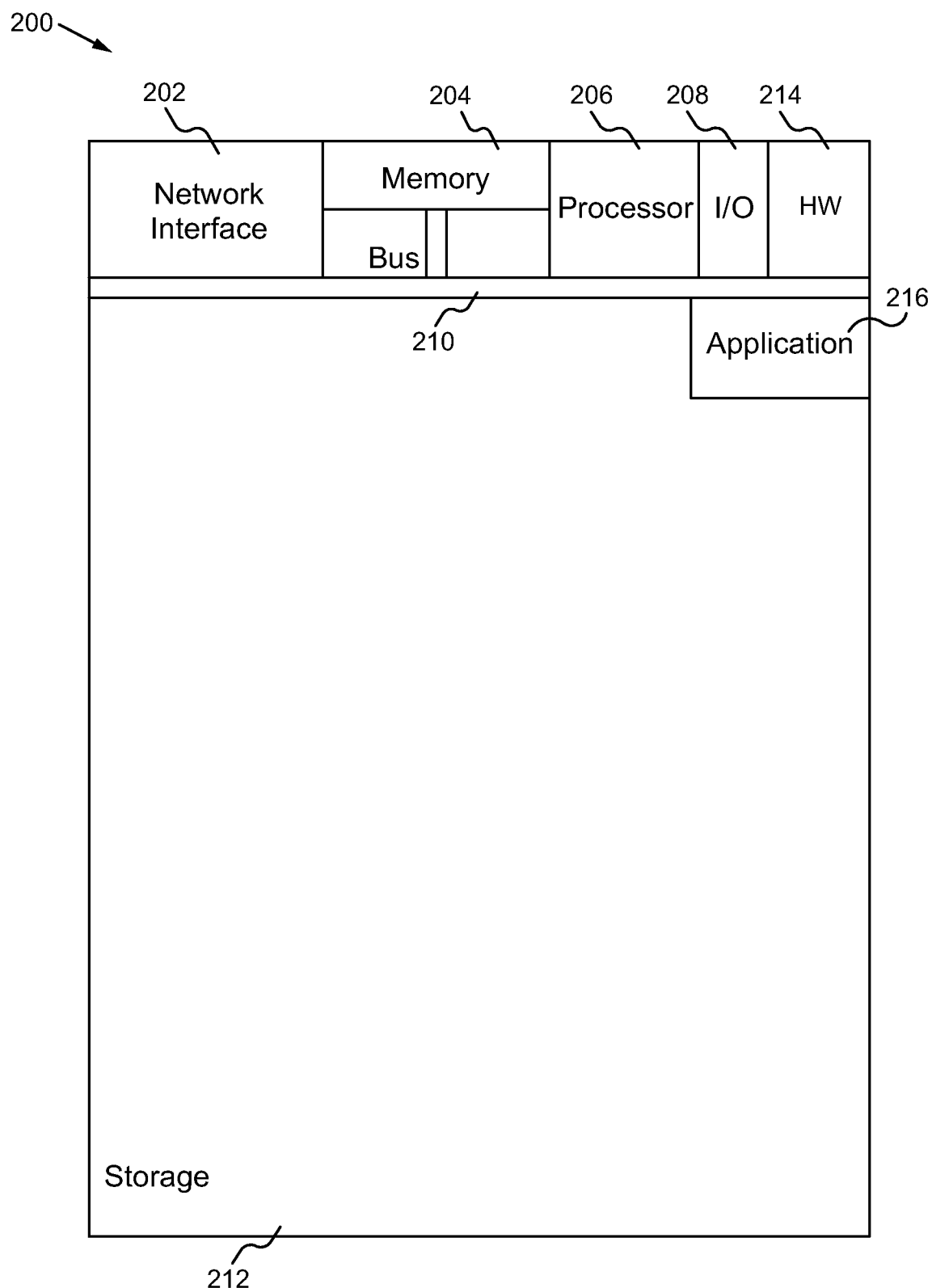
FIG. 2 illustrates a block diagram of an exemplary computing device according to some embodiments.

FIG. 2 illustrates a block diagram of an exemplary computing device 200 according to some embodiments. The computing device 200 is able to be used to acquire, cache, store, compute, search, transfer, communicate and/or display information. The server(s) in the cloud 110 and/or the end-user devices 115 of the FIG. 1 can be similarly configured as the computing device 200.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card, RAM, ROM, EPROM, EEPROM or any other storage device. The computing device 200 is able to include one or more network interfaces 202. An example of a network interface includes a network card connected to an Ethernet or other type of LAN. The I/O device(s) 208 are able to include one or more of the following: camera, keyboard, mouse, monitor, display, printer, modem, touchscreen, button interface, sensors (e.g., orientation sensor, accelerometer, etc.), microphone, and other devices. Application(s) 214, such as the client application or one or more server side applications implementing the service discussed herein, are likely to be stored in the storage device 212 and memory 204 and are processed by the processor 206. More or less components or modules shown in FIG. 2 are able to be included in the computing device 200. For example, the computing device 200 can include an interface module that generates at least one graphical user interface (GUI) that is accessible by users to interact with the service.

The computing device 200 can be a server or an end-user device. Exemplary end-user devices include, but are not limited to, a tablet, a mobile phone, a smart phone, a smart watch, a desktop computer, a laptop computer, a netbook, or any suitable computing device such as special purpose devices, including set top boxes, automobile consoles, and social media/entertainment kiosks located in public areas (e.g., malls).

The client application is configured to activate, utilize, interact with, and/or control the camera, the microphone, and the sensors of the end-user device. The camera, the microphone, and/or the sensors can be distinct and separate from the end-user device, or can be integral with the end-user device. The sensors can be hardware based, software based, or a combination thereof, that detect properties and attributes of the end-user device. For example, the client application can use the orientation sensor(s) to detect the physical orientation of the end-user device and changes in physical orientation of the end-user device. For another example, the client application can use the accelerometer(s) to detect changes in acceleration of the end-user device to distinguish between different orientations of the end-user device.

Figure 3A:
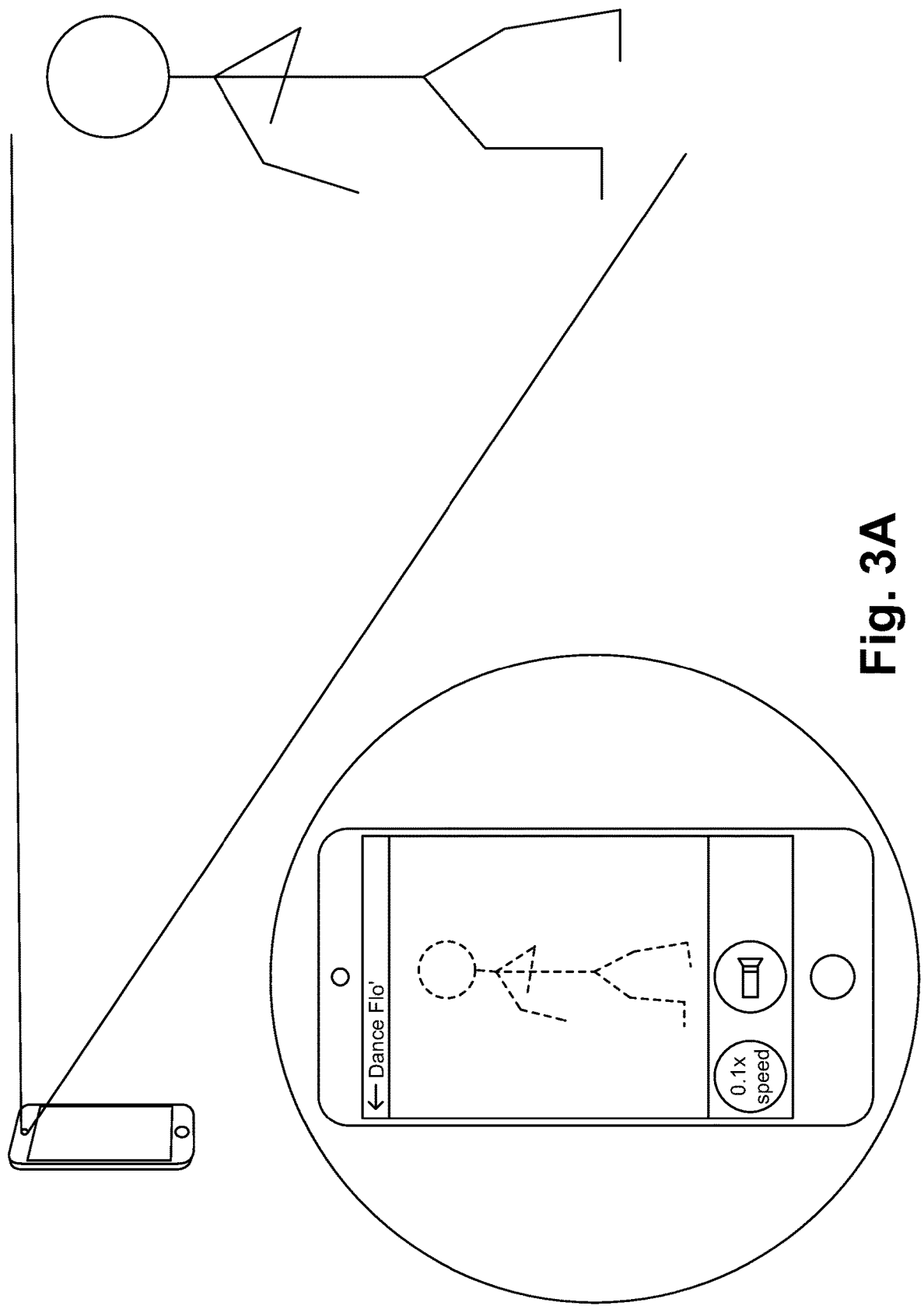
FIGS. 3A-3B illustrate an end-user device operating in a first mode according to some embodiments.
Figure 3B:
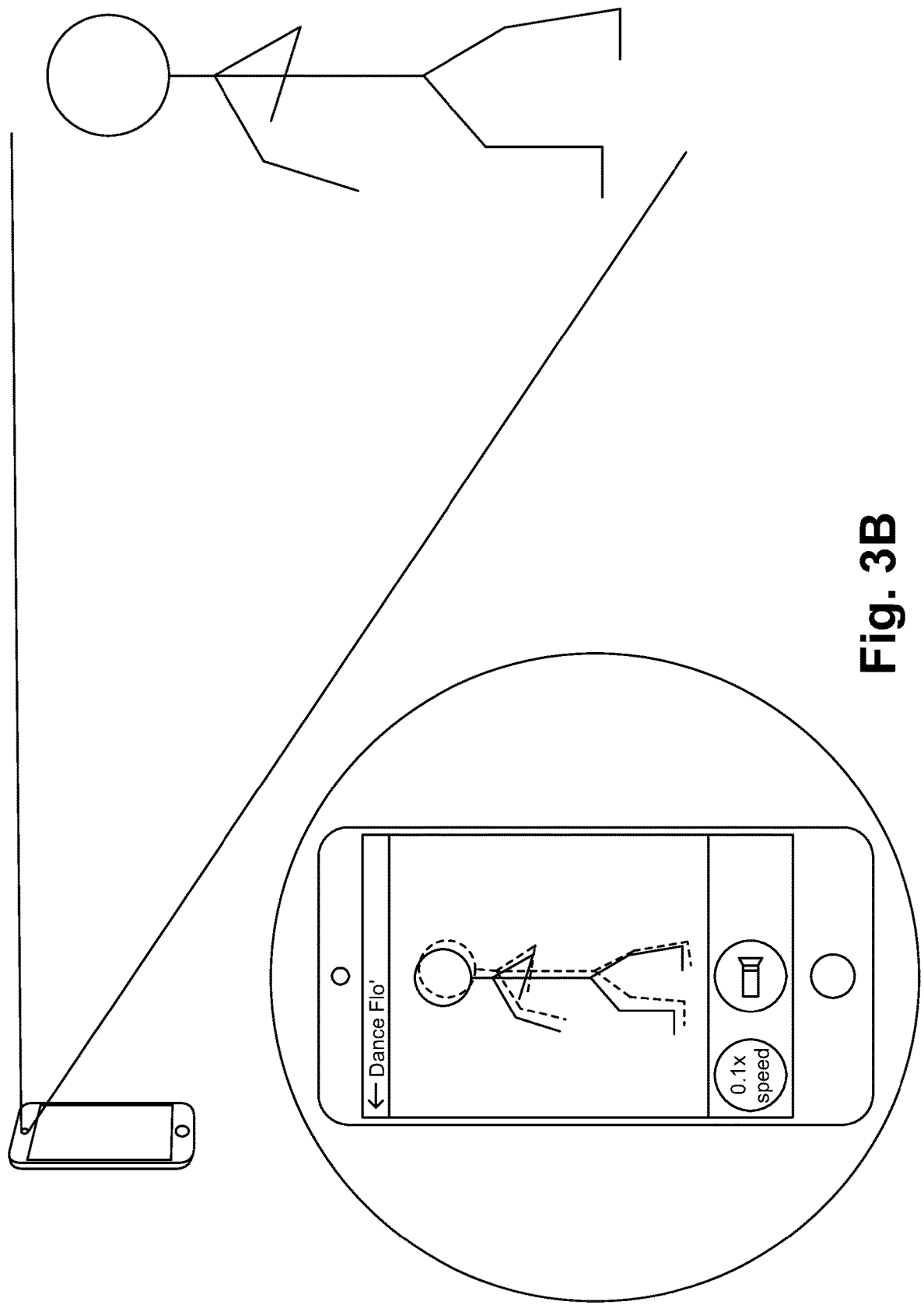

When the end-user device is in a first orientation (e.g., vertical), the client application operates in a first mode. In the first mode, a first graphical user interface is generated to display an existing video. The existing video can be located on the end-user device, or can be remotely located from the end-user device and streamed to the end-user device. The existing video can be a video specifically searched for by the user at the cloud or can be a daily challenge video suggested by the service. Regardless, upon a manual command, such as a voice command or a touch command, to start or, alternatively, after upon an automatic start after a predetermined amount of time (e.g., five seconds), the existing video starts to play at a user-selected speed (e.g., 0.1×, 0.25×, 0.5×, 0.75×, normal) in the first graphical user interface while the camera simultaneously captures a continuous recording of the field of view of the camera. The user(s) is in the field of the view of the camera and mimics the movements of a performer(s) in the existing video. In some embodiments, the field of view of the camera is overlayed, with transparency, over the existing video in the first graphical user interface such that the user can line up with the performer. The transparency level is adjustable by the user to change the opacity of the user displayed in the first GUI. Alternatively, the field of view and the existing video are displayed side by side in the first graphical user interface. In some embodiments, a grid can be displayed to help the user align with the performer. In FIG. 3A, the transparency level is set such that only the performer in the existing video is shown in the first GUI but not the user who is in the field of view. In FIG. 3B, the transparency level is such that the user who is in the field of view is also shown in the first GUI. In particular, as illustrated in FIG. 3B, the performer in the existing video is shown in dashed lines, while the user in the field of view of the camera is shown in solid lines. The user mimics or follows what is displayed in the first graphical user interface as if in a mirror.

The client application is configured to hipsync or convert the recording to the normal playback speed of the existing video either on the fly (e.g., as the recording is being captured) or when the recording stops. The recording can stop via a voice command or a touch command to stop, when the video ends, or when the client application detects that the end-user device is no longer in the first orientation. Alternatively, the client application is configured to transmit the recording, and associated metadata, either in real-time (e.g., as the recording is being captured) or at the end of the recording to the server for hipsyncing or conversion. Regardless of where the hipsyncing or conversion takes places, the hipsynced or converted recording shows the user making the movements at a full, normal speed.

Figure 4A:
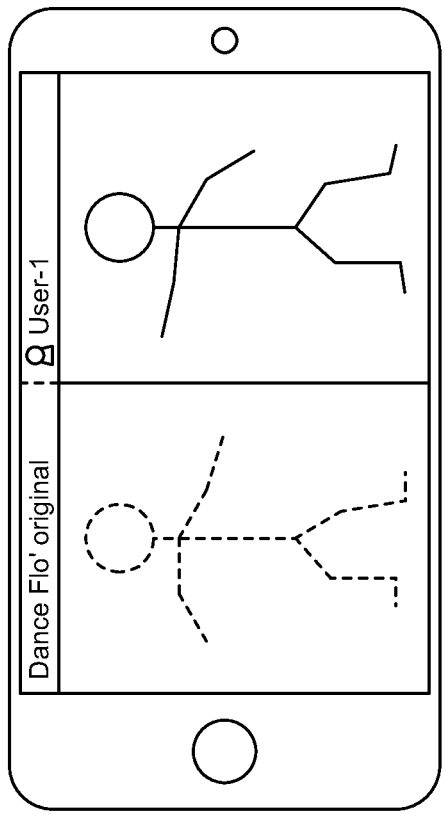
FIG. 4A-4C illustrate an end-user device operating in a second mode according to some embodiments.

The client application operates in a second mode when the end-user device is in a second orientation (e.g., horizontal) or, alternatively, after the end of the recording. In the second mode, a second graphical user interface is generated to display the hipsynced or converted recording. In some embodiments, the hipsynced or converted recording is played in the second graphical user interface. Alternatively or in addition to, the existing video is played at the normal playback speed and side-by-side with the hipsynced or converted recording playing in the second graphical user interface. For example, the existing video is played in a first portion of the second graphical user interface and a hipsynced video is played on a second portion of the second graphical user interface, as illustrated in FIG. 4A. This split graphical user interface allows a viewer to compare the two videos side by side. In some embodiments, the title associated with the existing video or the username of the user associated with the hipsynced video is shown above each portion of the second graphical user interface.

Figure 4B:
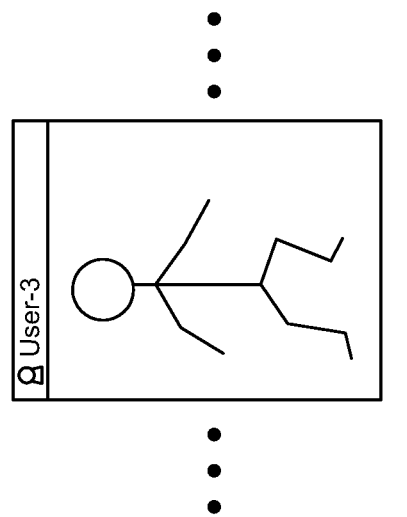
Figure 4B:
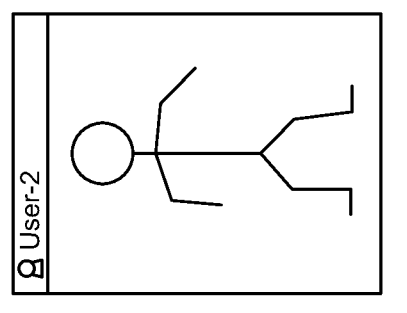
Figure 4B:
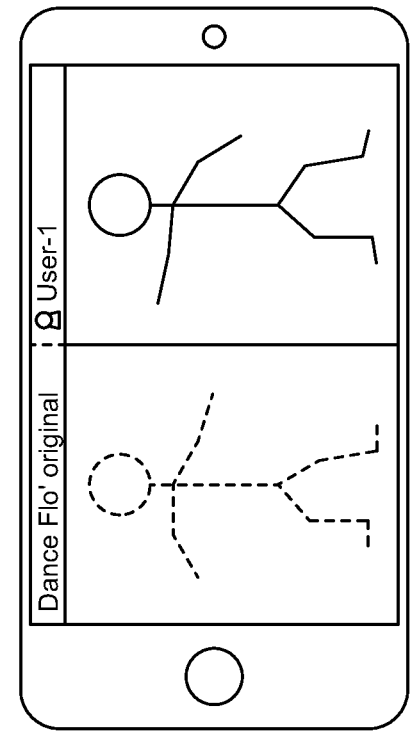

The client application is able to detect inputs applied when the end-user device is in the second orientation and to respond according to detected inputs. Exemplary inputs are swipes, taps, pinches, touches, and the like. As illustrated in FIG. 4B, gestures of a first type (e.g., left and right swipes) that are applied to either the first portion or the second portion of the second graphical user interface enable the user to scroll through all of the hipsynced videos associated with the existing video on that portion of the second graphical user interface while the content remains displayed and unchanged in the other portion of the second graphical user interface. When the user stops at a particular hipsynced video, that hipsynced video and the other video are played concurrently, from the beginning, in their respective portions of the second graphical user interface. The user is able to combine a hipsynced video with the existing video or another hipsynced video for side by side comparisons. In some embodiments, these hipsynced videos that are associated with the existing video typically have the same musical content or soundtrack.

Figure 4C:
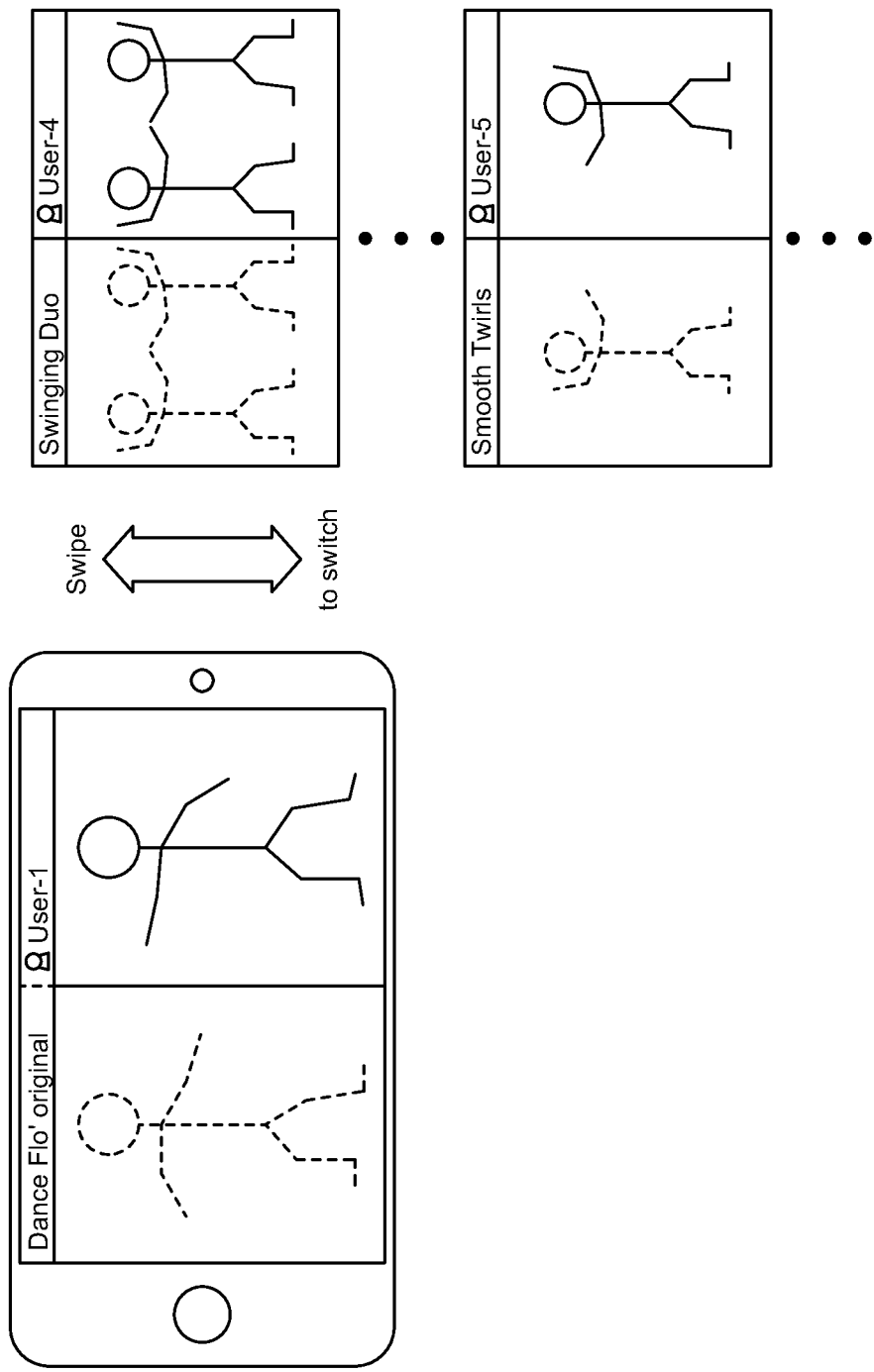

As illustrated in FIG. 4C, gestures of a second type (e.g., up/down swipes) that are applied to the second graphical user interface enable the user to browse through other existing videos and to view one or more hipsynced videos associated with a selected existing video by using left/right swipes described above. In some embodiments, the existing video is always shown upon a gesture of the second type after a gesture of the first type. In some embodiments, the most recent related hipsynced video is shown with the existing video.

In some embodiments, gestures of a third type (e.g., tap(s)) that are applied to the second graphical user interface enable the user to access a menu including options to comment, to rate, to share, and to challenge others within the application or in other social networks, regarding an existing video or a hipsynced video. In some embodiments, comments are shown in real-time for a predetermined amount of time as overlays in the first or the second portion of the second graphical user interface. In some embodiments, only a portion of all comments for a hipsynced video that is pertinent to the viewer is displayed. For example, only comments from the viewer's friends/connections previously established within the cloud, are displayed.

Figure 5:
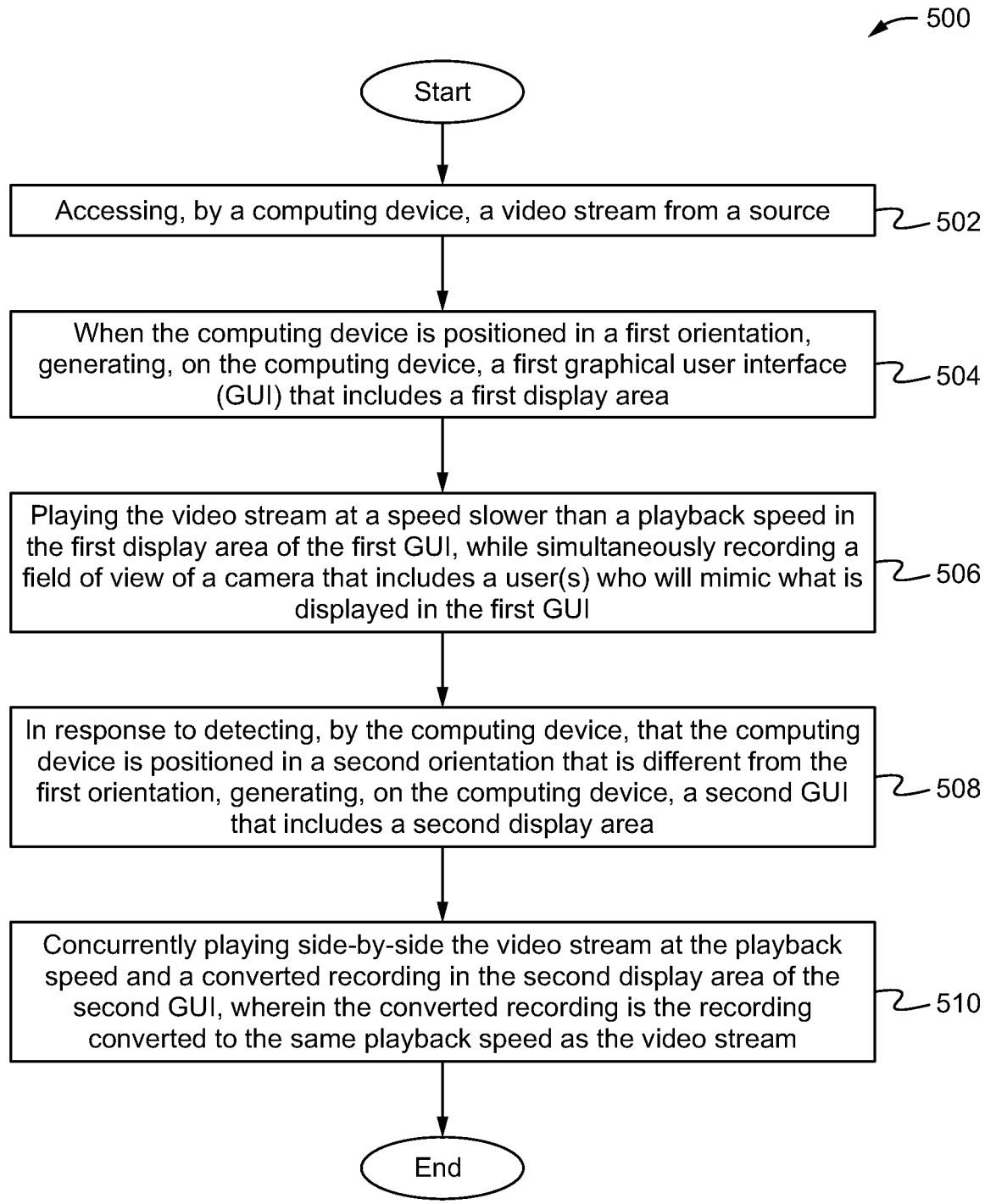
FIG. 5 illustrates an exemplary method of dynamically generating video data according to some embodiments.

FIG. 5 illustrates an exemplary method 500 of dynamically generating video data according to some embodiments. The method 500 begins at a Step 502, where a video stream is accessed by a computing device (e.g., an end-user device) a source. The source can be a remotely located from or locally located on the computing device. When the computing device is positioned in a first orientation, at a Step 504, a first graphical user interface (GUI) is generated on the computing device and includes a first display area, and at a Step 506, the video stream is played at a speed slower than a playback speed in the first display area of the first GUI, while a field of view of a camera is simultaneously being recorded. The field of view includes a user(s) who will mimic what is displayed in the first GUI. The speed slower than the playback speed can be a speed that is user selected prior to the Step 506. In some embodiments, the field of view of the camera is concurrently displayed with the video stream in the first display area of the first graphical user interface. In some embodiments, the field of view of the camera is overlayed, with adjustable transparency, over the video stream in the first display area of the first graphical user interface. Alternatively, the field of view and the video stream are displayed side by side in the first display area of the first graphical user interface. At a Step 508, in response to detecting, by the computing device, that the computing device is positioned in a second orientation that is different from the first orientation, a second GUI is generated on the computing device and includes a second display area. At a Step 510, the video stream is concurrently played at the playback speed and side-by-side with a converted recording in the second display area of the second GUI. The converted recording is the recording converted to the same playback speed as the video stream. In some embodiments, the recording is converted on the fly to the same playback speed as the video stream. Alternatively, the recording is converted when the recording had stopped. The recording can stop via a voice command or a touch command to stop, when the video ends, or when the client application detects that the end-user device is no longer in the first orientation. The method 500 ends after the Step 510.

The method 500 includes a creation process and a viewing process. The creation process focuses on copying what a user sees on the end-user device as the user is being recorded. The viewing process uses a double or side-by-side graphical user interface that displays content that is hipsynced together. Each portion of this graphical user interface can display either the original or existing video, or one of the hipsynced recordings associated with the existing video. For example, the left portion of the graphical user interface could display the existing video, which is used to create the hipsynced video that is displayed on the right portion of the graphical user interface, both of videos have the same soundtrack. Furthermore, the viewing process allows a viewer can view other hipsynced videos associated with the existing video using left/right swipes, and can view other existing videos and associated hipsynced videos using up/down swipes. In some embodiments, videos of different soundtracks can be concurrently played in the graphical user interface.

In some embodiments, the server is able to combine a plurality of hipsynced videos received from one or more end-user devices to create a thread. The thread can be shared with just those whose hipsynced videos are as part of the thread and/or with others. An exemplary thread could be a plurality of hipsynced videos of people all copying a Happy Birthday greeting but each in their own way, that is combined together. In some embodiments, instead of copying from an original or existing video, a user can copy movements in a hipsynced video that is received or otherwise provided, thus making a "Telephone Game" version—while they should all be the same, the last one usually differs from the existing video in a very distinct way. Another exemplary thread could be a plurality of hipsynced videos that together tells a story or makes up a complete song. In the complete-a-song scenario, each user participating in the threading receives a portion of the original or existing video to mimic from. Once the hipsynced videos are received from all users participating in the threading, the server combines the hipsynced videos together accordingly. Alternatively, each user participating in the threading receives the entirety of the original or existing video to mimic from. Once the hipsynced videos are received from all users participating in the threading, the server splices up the hipsynced videos and combines the spliced hipsynced videos together accordingly. Although it is discussed herein that the end-user device includes a native or built-in camera and a native or built-in display screen, it is contemplated that a separate camera and/or a separate display screen can be used.

Figure 6:
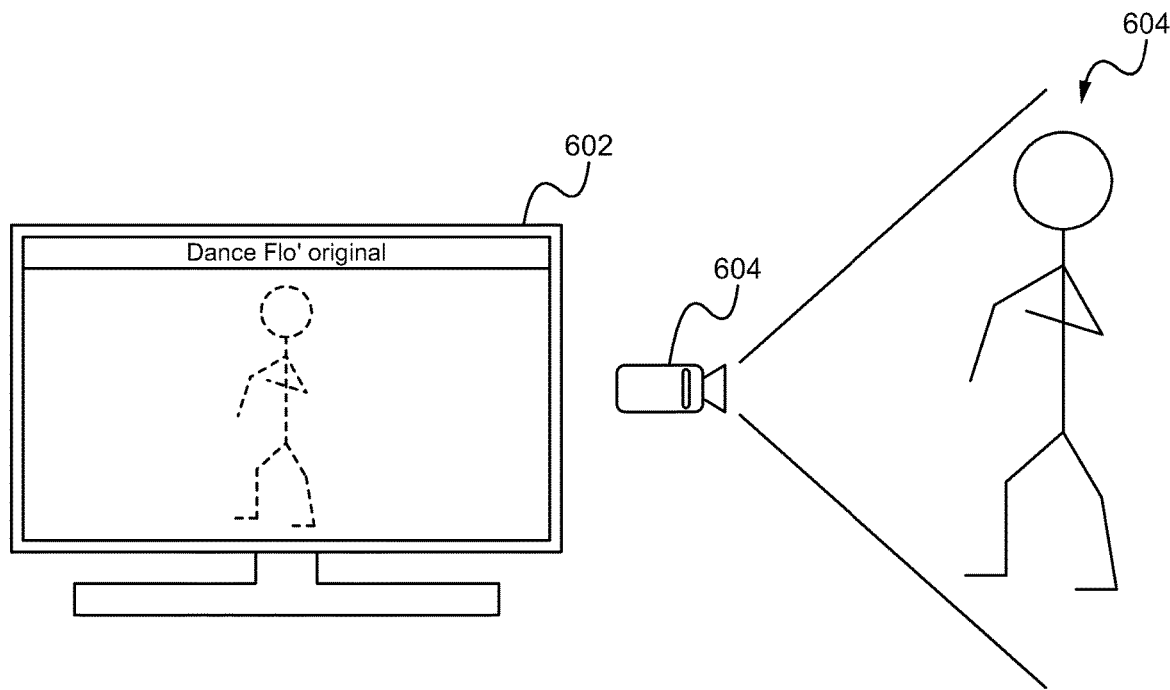
FIGS. 6-7B illustrate an exemplary use scenario according to some embodiments.
Figure 7A:
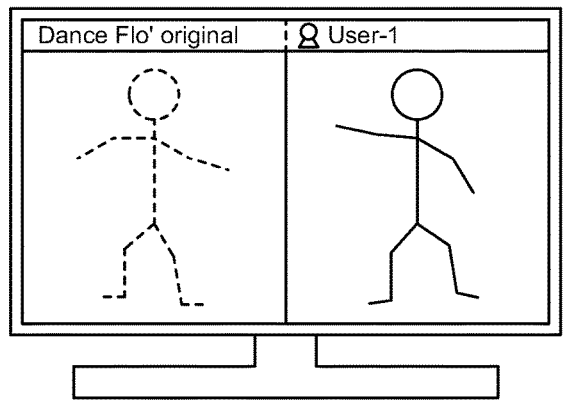
Figure 7B:
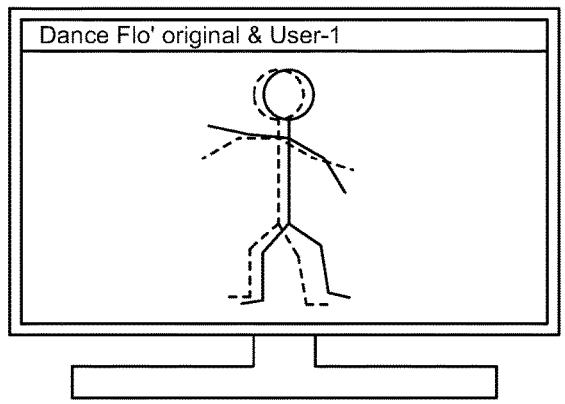

FIGS. 6-7B illustrate an exemplary use scenario according to some embodiments. As discussed herein, the present invention allows a user to mimic the movements of another. Preferably, a first person performs a movement, such as a dance routine. That original performance is recorded using a digital recording means such as a digital camera. The original performance is displayed on a screen 602 to a user 606 as shown in FIG. 6. While viewing the original performance displayed on the screen 602, the user 606 attempts to mimic the original performance. The original performance can be shown to the user at regular speed or at a slower speed to ease the difficulty of mimicking the original. The user's mimicked performance is recorded using a digital camera 604. The original performance and the mimicked performance are combined for display to show the quality of the mimicked performance. The two performances can be shown side as displayed, as illustrated in FIG. 7A, or on top of one another, as illustrated in FIG. 7B.

The digital camera 604 can be the same camera used to record the original performance but generally is not. The display 602 and camera 604 can be two separate devices such as in a home entertainment system, in an arcade kiosk, or at a large event, such as an arena having large viewing screens and separate camera systems. Alternatively, the display 602 and camera 604 can be in an integrated system such as tablet computer, certain laptop computers or a smart phone.

In some embodiments, augmented reality (AR) is integrated with the service. Graphics, audio, and/or other sensory enhancements can be superimposed over a real-world environment in an existing video or in a hipsynced video. For example, a computer-generated trainer can be embedded in an existing video to provide encouragement during an exercise routine. For another example, computer-generated backup dancers can be embedded in a hipsynced video to provide visual symmetry and rhythm to accompany the music. In some embodiments, a user is able to edit a hipsynced video by selecting content of the AR to be embedded in the hipsynced video.

The service can be applied to a multitude of themes and learning experiences including but not limited to instruments, sports, exercise/yoga, and mime. As demonstrated herein, the service provides a mirror learning experience, which is learning by imitating an on-screen image, recording and playing back in a unique comparison environment. The varying speeds selection enables a user to select a play speed that the user is comfortable with to mimic movements and improve themselves. The side-by-side graphical user interface allows a user to provide gesture inputs on separate portions of the graphical user interface for comparison, commenting, rating, and sharing purposes.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A method comprising:
   accessing, by a computing device, a video stream from a source;
   when the computing device is positioned in a first orientation,
      generating, on the computing device, a first graphical user interface (GUI) that includes a first display area, and
      playing the video stream at a speed slower than a playback speed in the first display area of the first GUI, while simultaneously recording a field of view of a camera which includes at least one user who will mimic what is displayed in the first GUI; and
   in response to detecting, by the computing device, that the computing device is positioned in a second orientation that is different from the first orientation,
      generating, on the computing device, a second GUI that includes a second display area, and
      concurrently playing side-by-side the video stream at the playback speed and a converted recording in the second display area of the second GUI, wherein the converted recording is the recording converted to the same playback speed as the video stream.

2. The method of claim 1, wherein the converted recording is the recording converted on the fly.

3. The method of claim 1, wherein the converted recording is the recording converted when the recording had stopped.

4. The method of claim 1, wherein the field of view of the camera is concurrently displayed with the video stream in the first display area of the first GUI.

5. The method of claim 1, further comprising, when the computing device is positioned in the second orientation, concurrently playing side-by-side the converted recording and another converted recording in the second display area of the second GUI.

6. The method of claim 1, further comprising, when the computing device is positioned in the second orientation, upon detecting a swipe gesture of a first type on the computing device:
   accessing from a destination another converted recording associated with the same musical content as that of the video stream; and
   playing, on the computing device, the another converted recording associated with the same musical content as that of the video stream.

7. The method of claim 6, further comprising, when the computing device is positioned in the second orientation, upon detecting a swipe gesture of a second type on the computing device, wherein the first type is different from the second type:
   accessing from the destination a converted recording associated with a musical content different from that of the video stream; and
   playing, on the computing device, the converted recording associated with the musical content different from that of the video stream.

8. The method of claim 7, further comprising transmitting the converted recording.

9. The method of claim 8, wherein the converted recording is transmitted to the destination for storing.

10. The method of claim 8, wherein the converted recording is transmitted to another computing device to create a video thread based on the converted recording.

11. An apparatus comprising:
    at least one sensor;
    a camera; and
    a controller operable to:
       access a video stream from a source;
       upon detection by the at least one sensor that the apparatus is positioned in a first orientation,
          generate a first graphical user interface (GUI) that includes a first display area, and
          play the video stream at a speed slower than a playback speed in the first display area of the first GUI, while simultaneously recording a field of view of the camera which includes at least one user who will mimic what is displayed in the first GUI; and
       upon detection by the at least one sensor that the apparatus is positioned in a second orientation that is different from the first orientation,
          generate a second GUI that includes a second display area, and
          concurrently play side-by-side the video stream at the playback speed and a converted recording in the second display area of the second GUI.

12. The apparatus of claim 11, wherein the at least one sensor includes an orientation sensor.

13. The apparatus of claim 11, wherein the converted recording is the recording converted on the fly.

14. The apparatus of claim 11, wherein the converted recording is the recording converted when the recording had ended.

15. The apparatus of claim 14, wherein the recording ends when the video ends.

16. The apparatus of claim 14, wherein the recording ends when apparatus is no longer in the first orientation.

17. A system comprising:
   an end-user device configured to:
      access a video stream from a source;
         when the end-user device is positioned in a first orientation, generate a first graphical user interface (GUI) that includes a first display area, and
         play the video stream at a speed slower than a playback speed in the first display area of the first GUI, while simultaneously recording a field of view of a camera which includes at least one user who will mimic what is displayed in the first GUI; and
      upon detecting that the end-user device is positioned in a second orientation that is different from the first orientation,
         generate a second GUI that includes a second display area, and
         concurrently play side-by-side the video stream at the playback speed and a converted recording in the second display area of the second GUI; and
   a server communicatively coupled with the end-user device, wherein the server is configured to receive from the end-user device the converted recording for storing.

18. The system of claim 17, wherein the server is also configured to:
   receive from a plurality of end-user devices a plurality of converted recordings to stitch the plurality of converted recordings together into a video thread; and
   transmit the video thread to at least one of the plurality of end-user devices.

19. The system of claim 17, wherein the video stream is augmented by computer-generated perceptual information.

20. The system of claim 17, wherein the converted recording is augmented by computer- generated perceptual information.

* * * * *